United States Patent [19]

Dalton et al.

[11] Patent Number: 5,515,329
[45] Date of Patent: May 7, 1996

[54] VARIABLE-SIZE FIRST IN FIRST OUT MEMORY WITH DATA MANIPULATION CAPABILITIES

[75] Inventors: David C. Dalton; Roger W. Cover, both of Tucson, Ariz.; Richard Andelfinger, Thornton, Colo.

[73] Assignee: Photometrics, Ltd., Tucson, Ariz.

[21] Appl. No.: 334,537

[22] Filed: Nov. 4, 1994

[51] Int. Cl.$^6$ ........................................... G11C 7/00
[52] U.S. Cl. ..................... 365/221; 365/231; 365/238
[58] Field of Search ........................ 365/221, 231, 365/238, 238.5, 239; 364/231.8; 395/425

[56] References Cited

U.S. PATENT DOCUMENTS 4,809,161  2/1989  Torii et al. ........................ 365/221
5,412,611  5/1995  Hattori et al. ..................... 365/221
5,438,614  8/1995  Rozman et al. ..................... 379/93

*Primary Examiner*—David C. Nelms
*Assistant Examiner*—Vu A. Le
*Attorney, Agent, or Firm*—Herbert M. Shapiro

[57] ABSTRACT

A FIFO memory system exhibits data processing capabilities by the inclusion therein of a digital signal processor and an associated dynamic random access memory. The digital signal processor provides significant data processing on the fly while the dynamic random access memory array provides additional buffering capability. Input and output FIFOs are connected to the data and address bussed of the digital signal processor. The control of the digital signal processor is via a host processor connected to the digital signal processor by a serial communication link.

6 Claims, 1 Drawing Sheet

VARIABLE-SIZE FIRST IN FIRST OUT MEMORY WITH DATA MANIPULATION CAPABILITIES

FIELD OF THE INVENTION

This invention relates to First-In-First-Out (FIFO) Memories such as a shift register an more particularly to such a memory organization in which data can be manipulated.

BACKGROUND OF THE INVENTION

FIFO memories are well known in the art. Such memories are serial memories in which data are moved along a sequence of storage locations from input to output. Examples of such memories are static, RAM arrays, magnetic bubble memories, tapes. . . etc. Such memories also have been used with buffers to capture data when memory capacity is exceeded.

BRIEF DESCRIPTION OF AN ILLUSTRATIVE EMBODIMENT OF THIS INVENTION

In accordance with the principles of the present invention, a FIFO memory system provides a data manipulation capability by the inclusion therein of a digital signal processor (DSP) with an associated Dynamic Random Access Memory (DRAM) with a FIFO input and a FIFO output. The DSP is operative to process data from the input FIFO to the output FIFO. Between the input and the output FIFO's, the DSP is free to perform any operation on the data that is deemed necessary. The DRAM array provides additional buffering capability, enabling the system to provide FIFO operation in the multiple megabyte size range. The DSP provides all DRAM control.

The system includes a small regular FIFO to buffer input to the DSP, a small regular FIFO to buffer output from the DSP, the DSP, and a large dynamic RAM array to hold data. The DSP in the system provides for data transform or analysis as the FIFO operates thus providing a vastly improved functionality in the system particularly when the system is operated to process large amounts of data in a relatively short time.

The FIFOs are connected to the address and data busses of the DSP. In addition, external logic provides interrupts to the DSP to indicate when the FIFOs need service. The DSP built-in interrupts controller allows the software in the DSP to control when and if those interrupts are serviced.

The DRAM is connected to the address and data busses of the DSP as well. The DRAM is operated in page mode and the page is selected via a special external paging register. This arrangement allows the DSP to address an extremely large number of pages. In addition, the DSP has control over a set of bank select signals to select individual DRAM banks. This three-tiered DRAM addressing scheme allows the DSP to address virtually any size DRAM array.

The DSP, in a system in accordance with the principles of this invention, is capable of modifying data on the fly. Accordingly, a serial communication link, termed the "Synchronous Serial Interface" (SSI) is connected to the DSP to control the operation of the DSP. The SSI allows an external processor to transmit commands to the DSP while the DSP is in the process of providing FIFO and DRAM services.

One illustrative usage of the system is to capture a histogram of the data which has passed through it. The histogram is useful in later image processing functions on the host computer to which the system connects. The SSI provides the ability to read the histogram from the DSP after an image has passed through the FIFO. The operation relieves the host computer of the burden of having to calculate the histogram itself.

In addition, the SSI allows the host computer to issue commands to the DSP to change it's behavior on the fly. This capability allows the system to adapt to the needs of the moment, modifying the data transform functions as needed by the host system.

DETAILED DESCRIPTION OF AN ILLUSTRATIVE EMBODIMENT OF THIS INVENTION

Figure 1:
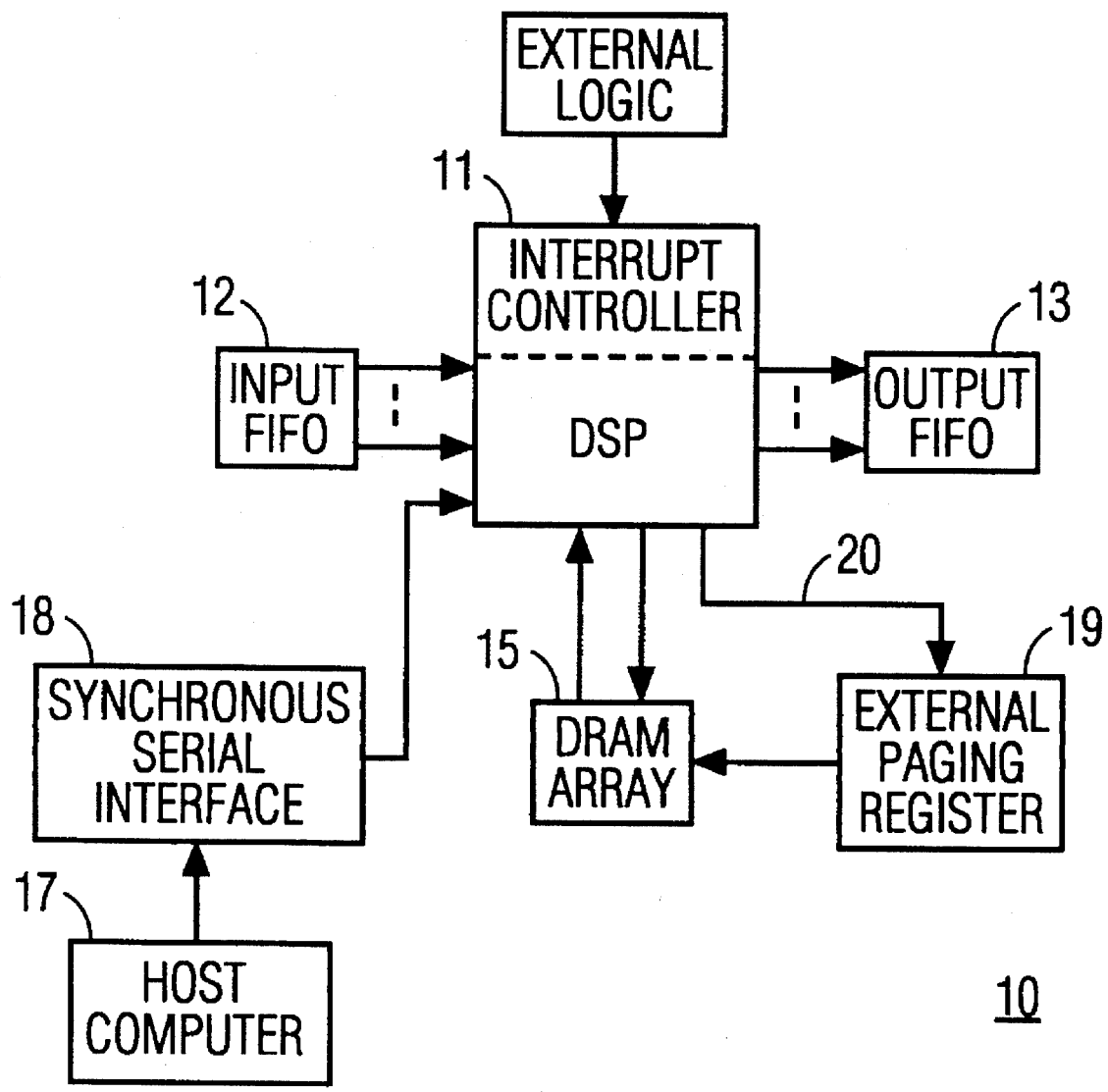
FIG. 1 is a block diagram of a FIFO memory system with data manipulation capabilities in accordance with the principles of this invention.

FIG. 1 shows a block diagram of a system 10 in accordance with the principles of this invention. The system includes a digital signal processor (DSP) 11 with input and output FIFOs 12 and 13 respectively. The DSP includes data and address busses to which the FIFOs are connected. A dynamic Random Access Array 15 also is connected to the data and address busses of the DSP. A host computer 17 is connected to the DSP via a serial communication link 18 as shown in the figure. An external paging register 19 is connected to the DRAM and is operative responsive to commands from DSP via a link represented by line 20. The system is operative to process large amounts of data in a relatively short time.

The system of FIG. 1 is operative to perform a variety of functions under the control of host computer 17 via the SSI (18). One such operation is a histogram where data representative of an image is represented graphically on a bar chart (for example) of the number of pixels in the image at a given intensity. The graph is a plot of the number of data points verses intensity from black to white. Histograms are well known in the art and are not discussed further herein. Another operation is to find the maximum and minimum intensity values. The initialization of the system of FIG. 1 along with the commands and an example test session is as follows:

Initialization and P.O.S.T.

When the system starts, the SSI will be disabled until after the bootstrap loads the program (about 700 μsec). During this time, the microwire interface will return all 1s. The response code $FF will indicate that the DSP is still performing the bootstrap load. After bootstrap completion the SSI will be initialized and activated. A response code of zero (0) will be read after this point. No commands except the null command should be sent until P.O.S.T. has completed. An additional flag to indicate P.O.S.T. is the /PARTIAL signal. This bit will be low during P.O.S.T. and will go high at the end of the test.

During the P.O.S.T. the DSP may determine that the external program SRAM is not operating properly. If this is the case, the P.O.S.T. will be terminated without performing any further initialization or testing. The end of the P.O.S.T. will be signaled as indicated below with the SRAM subsystem bit set high.

The system will then initialize the DRAM to ensure proper operation and activate REFRESH processing. This is accomplished by generating no signals to the DRAM for 100 μsec (more than satisfied by the bootstrap load time), then generating 8 refresh cycles for each bank. At this point, the system will presume there are 4 banks installed.

The system will then perform tests of the following subsystems:

- Input FIFO (walking 1, walking 0 test).
- Output FIFO (walking 1, walking 0 test).
- Input FIFO transfer to output FIFO (walking 1, walking 0 test).
- Each bank of DRAM (write address to data).
- DRAM bank select (write bank to data).
- Input FIFO transfer to DRAM (walking 1, walking 0 test).
- DRAM transfer to output FIFO (walking 1, walking 0 test).

Data structures will be initialized to allow the installed DRAM to be used sequentially. Limits will be placed on the REFRESH so that only installed banks are refreshed. After completion of this, the system will wake up in the normal data buffering mode. The end of the P.O.S.T. will be signaled by the transmission of the Status Word (response code $05) from the DSP. Commands will be recognized from this point on.

Buffering Operation

*INITIALIZATION:* The system depends on the host processor performing the Reset memory command (see below) at least once for proper operation.

Burst transfers will be used to maximize the throughput of the system. Bursts of 512 pixels will be transferred for hardware reasons. When transferring to DRAM, page mode will be used to allow 75 ns per pixel writes and 75 ns per pixel reads. This will allow 10 MHz throughput in NON-BUFFERING mode, and 5 MHz throughput in BUFFERING mode.

An input burst is always triggered by inFIFO over 1/2 full. This indicates that pixels are available in the inFIFO. An output burst is triggered by inFIFO over 1/2 full in NON-BUFFERING mode, or outFIFO below 1/8 full in BUFFERING mode.

The system will wake up in NON-BUFFERING mode. In this mode, data from the inFIFO will be transferred to the outFIFO without involving the DRAM array. The outFIFO interrupt will be disabled.

When the outFIFO is more than 1/2 full on an inFIFO interrupt, the system will transit to BUFFERING mode. In this mode, data from the inFIFO will be transferred into DRAM, and the outFIFO interrupt will be enabled. Data from DRAM will be transferred into the outFIFO each time the outFIFO interrupt occurs.

When the outFIFO interrupt occurs with no data in DRAM, the system will transit to NON-BUFFERING mode. The outFIFO interrupt will be disabled and the DRAM read and write structures will be cleared.

Microwire Overview

The DSP on the buffer board will receive 3 bytes and send 3 bytes for each microwire transaction. To insure that commands have completed before issuing a new command, the 68HC16 will need to look for a "done" response from the DSP. The DSP will respond with a "busy" code until the command in progress completes. This will allow a complete handshake even on those commands that do not produce a response.

When a response is requested by a command, the DSP will include an 8 bit identifier with the 16 bit response. This will allow the 68HC16 to validate the response.

Commands

The order of bytes in each command will be: a 16 bit argument, most significant byte first; then a command byte. The command bytes are:

| | |
|---|---|
| $00 | Null Command (used to read while waiting for values) |
| $01 | Subsystem Test (argument identifies subsystem) |
| $02 | Return ROM revision date code |
| $03 | Reset memory (clear buffer, reset FIFOs, clear pixel count) |
| $04 | Send Buffer Size (in K pixels) |
| $05 | Send Status Word |
| $06 | Send control status |
| $07 | Send K pixels now in buffer |
| $08 | Send modulo 1 K pixels now in buffer |
| $09 | Send pixel count high word |
| $0A | Send pixel count low word |
| $0B | Send next read RAS address to use |
| $0C | Send next read CAS address to use |
| $0D | Send next write RAS address to use |
| $0E | Send next write CAS address to use |

The user interface to these commands using the debug port is: "*1 <CMD> <ARG>A" where the 1 indicates option slot 1, and should be replaced with a number [1..4] that indicates the actual slot where the SCSI board connected to the DRAM board under test is located.

Responses

The order of bytes in each response will be: an ID byte then a 16 bit argument, most significant byte first. *Note:* only the Null Command should be used until a non-zero response is read. Sending other commands could cause unpredictable results from all commands pending. The ID bytes are:

| | |
|---|---|
| 0 | DSP is busy processing the previous command |
| 224 + X | Subsystem X failure mask |
| 2 | ROM revision date code |
| 3 | Command 3 Complete |
| 4 | Buffer Size (in K pixels) |
| 5 | Status Word. This word has a bit set corresponding to each subsystem in the subsystem test. |
| 6 | Control status. LSB=FRAME_IN, PAGEMODE, LINE_STROBE,FRAME_STROBE, FIFORUN, NOT_MEM_FULL, MEMORY_NO_BURST, NOT_REFRESH, IN_FIFO_NOT_EMPTY, IN_FIFO_NOT_AEF, IN_FIFO_NOT_HALF, IN_FIFO_NOT_FULL, OUT_FIFO_NOT_EMPTY, OUT_FIFO_NOT_AEF, OUT_FIFO_NOT_HALF, MSB=OUT_FIFO_NOT_FULL |
| 7 | K pixels now in buffer |
| 8 | Modulo 1 K pixels now in buffer |
| 9 | Pixel count high word |
| 10 | Pixel count low word |
| 11 | Next read RAS address to use |
| 12 | Next read CAS address to use |
| 13 | Next write RAS address to use |
| 14 | Next write CAS address to use |

Subsystems

It is presumed that before any subsystem test the buffer will be reset with the reset memory command. It is further presumed that no input data will be presented to the Input FIFO during tests.

| | |
|---|---|
| 0 | External DSP program SRAM. (Reported by P.O.S.T. only, not available for test) |
| 2 | Input FIFO. |
| 3 | Output FIFO. |
| 4 | Input FIFO transfer to output FIFO. |
| 5 | Input FIFO transfer to DRAM. |
| 6 | DRAM transfer to output FIFO. |
| 7 | DRAM Bank Select (fills one page of each bank with the bank number and checks) |
| 8 | Bank 0 of DRAM |
| 9 | Bank 1 of DRAM |
| 10 | Bank 2 of DRAM |
| 11 | Bank 3 of DRAM |

The status word will have a bit set corresponding to the subsystem ID for each subsystem that fails a test. The failure mask returned by a subsystem test typically represents which bits are in error.

Example Test Session

To test a new DRAM daughter board you should place it in a camera with a SCSI host interface board. When it is mounted there, the SCSI board's debug command BIOS will allow you to perform the following tests:

| Type/Response | Notes |
| --- | --- |
| *1 0 0A | Type this to see the P.O.S.T. result. |
| 5 $300 | This is the P.O.S.T. result. Note that bits 8 & 9 are high, while the other bits are low. This indicates that subsystems 8 and 9 (DRAM 0 & 1) are inoperative. This is typical for an 8 Megapixel DRAM (where banks 0 & 1 are not installed). In this example, we will continue and test all DRAM. |
| *1 1 8A | This is the subsystem 8 (DRAM bank 0) test. This test requires approximately 20 seconds. |
| 5 $300 | *Note:* the response printed is not the result of the command. It is downloaded from the DRAM board while the command is being uploaded, so it is the previous response echoed again. |
| *1 0 0A | Type this to see the test results. |
| 0 $0 | Note that this response indicates the test is still in progress. |
| *1 0 0A | Type this to see the test results. |
| 232 $ffff | The $ffff indicates that all 16 bits have failed. This mask can be used to determine which bits (and thereby, which chips) are failing. |
| *1 1 9A | This is the subsystem 9 (DRAM bank 1) test. This test requires approximately 20 seconds. |
| 232 $ffff | |
| *1 0 0A | Type this to see the test results. |
| 233 $ffff | |
| *1 1 10A | This is the subsystem 10 (DRAM bank 2) test. This test requires approximately 80 seconds. |
| 233 $ffff | |
| *1 0 0A | Type this to see the test results. |
| 234 $0 | |
| *1 1 11A | This is the subsystem 11 (DRAM bank 3) test. This test requires approximately 80 seconds. |
| 234 $0 | |
| *1 0 0A | Type this to see the test results. |
| 235 $0 | |

What is claimed is:

1. A variable size FIFO memory system, said system including a digital signal processor (DSP) having an address and a data bus, said system including input and output FIFO memories both connected to said address and said data busses, said system also including a random access memory (RAM) connected to said address and data busses and operative in page mode and an external paging register responsive to commands from said DSP for selecting a page of said RAM, said system also including logic means external to said DSP and responsive to saturation indications from said FIFOs for providing interrupts to said DSP for storing overflow data from said FIFOs in said RAM at banks therein associated with a selected page.

2. A system as in claim 1 also including a serial communication link connected between said DSP and a host processor for communicating commands from host computer to said DSP while the DSP is in the process of providing services to said FIFO and RAM.

3. A system as in claim 2 wherein said RAM is a dynamic RAM.

4. A system as in claim 3 wherein said DSP is operative for manipulating data from said input FIFO responsive to commands from said host computer via said serial communication link.

5. A system as in claim 4 wherein said DSP includes means for for controlling a set of bank select signals to select individual dynamic RAM banks.

6. A system as in claim 5 wherein said DSP also includes an interrupt controller, said interrupt controller being responsive to said external logic means to interrupt instant operation of said DSP for priority servicing of said FIFOs.

* * * * *